United States Patent Office 2,941,897
Patented June 21, 1960

2,941,897
MANUFACTURE OF CERAMIC ARTICLES

Gerald A. Keitel, Chicago, Ill., assignor, by mesne assignments, to The Mansfield Sanitary Pottery Company, Perrysville, Ohio, a corporation of Ohio No Drawing. Filed Sept. 13, 1956, Ser. No. 609,532

11 Claims. (Cl. 117—17)

The present invention relates generally to the ceramic art and is more particularly concerned with novel methods of finishing and repairing or improving ceramic articles through the elimination of cracks and blemishes and similar common defects in their surface portions.

Although the ceramic art is old and highly developed, it holds a number of important problems which have heretofore remained beyond solution. Thus many determined but unsuccessful efforts have been made by those skilled in the art prior to the present invention to devise a method or means which would enable the application of glaze in a manner substantially easier and simpler to carry out and which would result in consistently uniform, high-quality glaze coatings or finishes. Likewise, the necessity for some method or means by which defective ceramic articles could be easily and economically processed for elimination of their defects and brought up to premium grade and quality has achieved the status of a classical problem in this art.

Certain surprising discoveries of mine, subsequently to be described, which underlie my present invention, constitute the key to both these problems and my new methods accordingly avoid all the shortcomings and derelictions invariably associated with the prior art practices. Furthermore, the methods or procedures involved in carrying the present invention into effect do not entail special preliminary or subsequent operations, or require the use of expensive materials, or involve any other offsetting disadvantage by comparison with the best prior art practices. In fact, it is one of the principal advantages of this invention that heretofore conventional practice may be carried out with comparatively little change in the manufacturing operations. Furthermore, as applied to the problem of repairing ceramic articles, the procedure of this invention necessitates no essential change in customary preliminary manufacturing operations and constitutes only a few additional steps in converting articles which heretofore could not be fixed or improved and which would therefore have either a greatly reduced or negligible value into the products of first quality and maximum value.

One of these discoveries of mine is that under certain critical substances glass or glaze, as it is known in that ceramic art, and similar dielectric substances can be applied to ceramic articles by conventional electrostatic spray techniques. I further found that when certain conditions are established and maintained prior to and during such spraying operations, the resulting glaze coatings will be uniformly distributed over the surface to be glazed, even when this surface is of complex geometrical form. More specifically, I have discovered that the surface of a ceramic article can be well coated or covered with a glaze delivered by an electrostatic spray apparatus when that ceramic surface has been provided with a coating of material which is receptive to high frequency electric current fields. In other words, I have found that a non-conductive article which is not normally receptive to such fields can be rendered a good subject for electrostatic spray operations producing coats of good quality and uniformity by the application to the surface of such articles of a finely-divided material of electric charge-receptive nature. According to my findings, up to the present time graphite, amorphous carbon and molybdenum disulphide have in common the characteristic of providing the kind of coating necessary to the practice of this invention. However, it is essential that these materials be used in finely-divided form and the particles thereof should all be less than about 12 microns in size if the important objects and advantages of this invention are to be consistently obtained.

All of the ingredients employed should be reduced to a fine state of division. In actual practice, grinding of the ingredients so as to pass a 200 mesh sieve (dry) has been found desirable. Exemplary compositions are as follows:

|  | A | B |
|---|---|---|
|  | Pounds | Pounds |
| Calcined talc | 2,100 | 250 |
| Raw talc | 875 | 250 |
| Ball clay | 385 | 88 |
| Ivory fat clay | 140 |  |
| Sodium silicate | 4 |  |
| Dextrin |  | 11 |
| Water | 1,350 | 92 |

In both of the above examples the talc employed was steatite. The calcined talc was calcined in lump or granular form and then finely crushed. It will be noted that the water content of the compositions ranges from 13% in B to 28% in A. Usually the water content is maintained between about 12% and 35% of the total, and at no time is it in excess of 45% or 50%. The clay content amounts to between 14% and 15% of the total solids in A and B. Usually the clay content is maintained between 10% and 25% of the total solids (dry basis), the talc comprising the major ingredient. Between about 40% and 70% of the total solids comprise calcined talc. Both of the bodies are distinctly short and both can be burned to a maturing temperature of about 2150–2200° F.

I have also discovered that articles of ceramic ware having cracks can in effect be welded together and cracks can be eliminated and all visible traces of surface blemishes and defects in such articles can likewise be eliminated through the establishment of certain critical conditions and maintenance of these conditions during finish glazing operations. Again, more specifically, I have found that if finely-divided graphite, amorphous carbon or similar material, as described above, is packed into a "fault" or crack or if a suspension of such material is applied as a coating over a local discoloration and glaze is then electrostatically sprayed on the thus prepared portion of the ceramic body, the article will display no visible sign of the original defect and a uniform and smooth glaze coating will be produced over the patch when the article is fired in the usual manner.

According to my further findings, there is nothing critical about the manner in which the graphite or equivalent material is applied to the surface to be electrostatically sprayed with glaze or similar substance. The graphite may be brushed on or sprayed on the ceramic article, or the article may be dipped in a suitable suspension of the finely-divided graphite. In fact, I have found that the graphite suspension may actually be puddled to appreciable depth on the ceramic article surface without adverse effect upon the ultimate glaze coating. Furthermore, the graphite suspension does not need to be specially treated prior to the electrostatic spraying operation and, if desired, the graphite suspension-coated surface may be electrostatically sprayed immediately following the application of the graphite suspension and before the suspension has been allowed to dry to any substantial degree.

Pigments or coloring substances can, according to my findings, be effectively applied to ceramic articles to produce finishes having color effects of good quality and these coloring agents can be used independently or they may be applied in admixture with the graphite or equivalent suspension. Thus, for example, I have found that cocoanut activated charcoal used in industrial operations to sequester various metal ions can be used when it is otherwise ready for waste to provide both the electrostatic spray base essential to this invention and to produce desirable color effects in the finished ceramic article, this charcoal being selected as to coloring agent content to produce the desired color and shade.

One of the most surprising things about these discoveries and this invention is the fact that such highly effective pigmenting materials as graphite, amorphous carbon and molybdenum disulphide may be used in virtually any amount without the slightest visible trace of this material in the finished ceramic article, even where only a clear glaze is applied as a finish coating. I have not been able to determine what occurs in the process of this invention to account for this truly amazing phenomenon. It is possible that oxidation takes place, but apparently no significant amount of gas of any type is evolved during the glaze firing operation because there is no evidence of blistering or bubbling in the finish glaze of typical products of this invention. Another possibility is that under the circumstances of conventional glaze firing there occurs an interaction between the graphite or equivalent and glaze components which results in the conversion of the black pigment material into white or clear compounds. In any event, however, absolutely complete elimination of the black pigment inevitably results in the present processes and the finished glaze is in no way ever adversely affected as a result of whatever chemical or physical-chemical reactions occur to produce this highly desirable result.

Those skilled in the art will understand that in view of the foregoing discoveries this invention in one of its aspects may be defined briefly as a method comprising the steps of coating a surface portion of a ceramic article with a substance of particle size less than about 12 microns, which substance is receptive to high frequency electric current field effects, electrostatically spraying finished glaze on the surface portion thus coated article, and finally firing the glaze at approximately its maturing temperature to form a smooth, finish glaze surface.

Those skilled in the art will also understand that in another of its aspects this invention, in brief, embodies a method comprising the steps of covering a defective surface portion of a ceramic article with a finely-divided, electrically-receptive substance, applying a glaze to the thus coated surface portion of the article, and finally subjecting the glaze to an elevated temperature and thereby fusing the glaze in situ to form a smooth and blemish-free glaze surface over the said surface coated portion.

As indicated above, the step of applying an electrostatic receptive material to a ceramic article surface to be glazed can be carried out in any of a number of different ways according to the preference and convenience of the operator. This step is not critical in any sense as to the manner in which it is executed except that the entire surface portion to be electrostatically sprayed must be covered with the graphite or equivalent material, and the material employed for this purpose must be of particle size less than 12 microns. There is no practical minimum graphite particle size insofar as the results of the present invention are concerned. Likewise, it is not generally important from the standpoint of the quality of the finished ceramic article whether the graphite or equivalent material is applied in water suspension or glycerin suspension, or whether alcohol or other organic liquid is used for the purpose. Of course, whatever vehicle is employed should not be deleterious to the final product and its cost should not be sufficiently high to adversely affect the economy of this process. Also, the consistency of these suspensions or the proportion of solids therein is not a critical matter and the operator has wide latitude in his choice in respect to this physical characteristic so long as the suspension used is capable under the conditions of use of consistently producing an unbroken coating, film or layer of graphite or equivalent receptive substance on the ceramic article surface being treated.

Electrostatic spraying steps of this method may suitably be carried out in accordance with presently conventional practice. Preferably, the emulsion-coated surface is directed toward the source of the electrostatic spray and the spraying operation will not be begun until the emulsion coating has hardened or set so that the continuous film of receptive material will not be broken and a uniform continuous glaze coating upon a ceramic surface will therefore be assured. This spraying operation will be carried out rapidly and when the requisite amount of glaze has been applied to the receptive surface of the article, this operation will be stopped and the article removed in preparation for the firing step.

Firing of the article likewise may be carried out in presently conventional manner, the article as a whole being disposed in a chamber or oven and subjected to an elevated temperature sufficient to fuse the overglaze or finish glaze coating. When the glaze has been melted to the usual extent, the article will be cooled preferably in the normal manner. The ceramic article will, without further processing, then be ready for sale and use unless it displays defects in appearance.

In repairing or removing defects or blemishes from ceramic articles as generally described above, the application of graphite in finely-divided form to the ceramic surface is carried out in any suitable manner. Thus when the fault or blemish amounts simply to a discoloration of a portion of the article, the graphite or equivalent coating described above is applied locally on that place as by spraying, or preferably by brushing procedure. However, when a crack is to be closed and sealed this application step will preferably involve "packing" the graphite material in emulsion form, as previously described, into the breach in the article surface. Normally, a brush will serve to produce the desired effect in this respect and only the surface area of the article immediately adjacent to the crack or blemish will be coated in addition to the walls of the crack itself.

The glaze may be applied as a coating to the graphite coated surface portion of the article and to the surface of the graphite deposit packed in the breach by means of electrostatic spray procedure. However, the glaze may be otherwise applied satisfactorily and with the consistently good results as, for example, by means of a brushing procedure. In any event, however, the surface of graphite deposit is thoroughly coated with the glaze as uniformly as practicable so that a continuous layer of graphite is formed over the defective spot.

The thus coated article is then subjected to elevated temperature, or at least the glaze coating on the graphite coated surface of the article is so heated, and the glaze is melted in situ to form a smooth and blemish-free surface over the defective part of the article under treatment.

Implicit in the repair or refinishing aspect of this invention is the fact that this process can be applied with consistently good results to glazed or finished articles as well as to unglazed ceramic surfaces. Thus, for example, a sanitary ceramic article such as a bath tub or sink which has been used and worn and stained can be refinished easily and economically, using electrostatic spray techniques. The bath tub or sink subjected to the present novel method will appear to be a new article and in fact will normally display a blemish-free surface of the highest quality.

In refinishing a fixture or article such as a bath tub by this method, the surface of the tub to be covered with a new enamel coating is first thoroughly cleaned for the removal of all loose particles, oil films, and dirt and then in either dry or wet condition following a thorough water rinsing is covered with emulsion of the type described above. In accordance with my preferred practice of this refinishing operation, the emulsion vehicle is evaporated so that a solid coating of finely-divided graphite, amorphous carbon or molybdenum disulphide will extend as a continuous layer over the original enamel surface and there will be no tendency for this layer to slip or break during application of new enamel to the article and the firing of the enamel. The tub then is electrostatically sprayed with finely-divided enamel or enamel frit to provide over the entire surface to be refinished a coating of unfired enamel powder sufficient to produce the desired refinished coating suitably through a conventional enamel-firing operation. As the final step, the bath tub is subjected to an elevated temperature corresponding to the maturing temperature of the freshly applied enamel and fresh enamel deposit is thereby fused, whereupon the tub is cooled and the refinishing operation is completed. This cooling operation is preferably carried out in conventional manner to eliminate the possibility of damage resulting from thermal shock or stress or other causes.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. The method of finishing ceramic ware which comprises the steps of coating a surface portion of a ceramic article with graphite of particle size less than about 12 microns, electrostatically spraying overglaze on the graphite-coated surface portion, and firing the article at approximately the maturing temperature of the overglaze and thereby eliminating all visible traces of the coating and forming a smooth glaze surface.

2. The method of finishing ceramic ware which comprises the steps of coating a surface portion of a ceramic article with amorphous carbon of particle size less than about 12 microns, electrostatically spraying overglaze on the amorphous carbon-coated surface portion, and firing the article at approximately the maturing temperature of the overglaze and thereby eliminating all visible traces of the amorphous carbon and forming a smooth glaze surface.

3. The method of finishing ceramic ware which comprises the steps of coating a surface portion of a ceramic article with molybdenum disulphide of particle size less than about 12 microns, electrostatically spraying overglaze on the molybdenum disulphide-coated surface portion, and firing the article at approximately the maturing temperature of the overglaze and thereby eliminating all visible traces of the molybdenum disulphide and forming a smooth glaze surface.

4. The method of finishing ceramic ware which comprises the steps of coating a surface portion of a ceramic article with a substance of particle size less than about 12 microns, which substance is receptive to high frequency electric current field effects, electrostatically spraying overglaze on the surface portion thus coated, and firing the article at approximately the maturing temperature of the overglaze and thereby forming a smooth glaze surface.

5. The method of eliminating cracks, blemishes and similar defects in ceramic articles which comprises the steps of covering a defective surface with an unbroken layer of graphite of particle size less than about 12 microns, applying glaze to the surface of the graphite layer or coating, and subjecting the glaze to an elevated temperature and thereby fusing the glaze in situ and forming a smooth and blemish-free glaze surface over the defective surface.

6. The method of eliminating cracks, blemishes and similar defects in ceramic articles which comprises the steps of covering a defective surface with a continuous coat of amorphous carbon of particle size less than about 12 microns, applying glaze to the amorphous carbon-coated surface portion of the article, and subjecting the glaze to an elevated temperature and thereby fusing the glaze in situ and forming a smooth and blemish-free glaze surface over the said coated surface portion.

7. The method of closing cracks and covering blemishes and similar defects in ceramic articles which comprises the steps of packing the cracks and covering the defective surfaces with an emulsion of molybdenum disulphide of particle size less than about 12 microns, applying glaze to the exposed molybdenum disulphide surfaces, and subjecting the glaze to an elevated temperature and thereby eliminating all visible traces of the molybdenum disulphide and fusing the glaze in situ and forming a smooth and blemish-free glaze surface over the defective portions of the articles.

8. The method of eliminating all visible traces of cracks, blemishes and similar defects in ceramic articles which comprises the steps of covering a defective surface with a substance receptive to high frequency electric current effects, said substance being of particle size less than about 12 microns, applying glaze to the thus covered defective portions of the article, and subjecting the glaze to an elevated temperature and thereby fusing the glaze in situ and forming a smooth and blemish-free glaze surface over the said defective portions.

9. In the manufacture of a ceramic article, the step of coating a portion of the article with a layer of graphite of particle size less than about 12 microns.

10. The method of refinishing a glazed ceramic article which comprises the steps of applying to a portion of its porcelain enamel surface an emulsion of a substance receptive to high frequency electric current field effects and of particle size less than about 12 microns and thereby forming a continuous coating of said substance over said surface, electrostatically spraying overglaze on the continuous coating of said receptive substance, and subjecting the overglaze to an eleveated temperature and thereby producing a smooth glaze surface on the article.

11. The method of refinishing a sanitary ceramic article which comprises the steps of applying to substantially the entire porcelain enamel surface of the article an emulsion of a substance receptive to high frequency electric current field effects and of particle size less than about 12 microns and thereby forming a continuous coating of said substance over said surface, electrostatically spraying overglaze on the article and thereby covering the continuous coating of said receptive substance, and subjecting the overglaze to a temperature approximately its maturing temperature and thereby producing a smooth glaze surface over the previously enamelled surface of the article, and cooling the article with the freshly-fused overglaze in situ gradually to about room temperature to avoid damaging thermal shock and stress.

References Cited in the file of this patent

UNITED STATES PATENTS

| | | |
|---|---|---|
| 1,570,137 | Fischer | Jan. 19, 1926 |
| 1,959,149 | Baggs et al. | May 15, 1934 |